US008682094B2

(12) United States Patent
Au et al.

(10) Patent No.: US 8,682,094 B2
(45) Date of Patent: Mar. 25, 2014

(54) ADAPTIVE SUBPIXEL-BASED DOWNSAMPLING AND FILTERING USING EDGE DETECTION

(75) Inventors: Oscar Chi Lim Au, Hong Kong (CN); Lu Fang, Hong Kong (CN)

(73) Assignee: Dynamic Invention LLC, Victoria, Mahe (SC)

( * ) Notice: Subject to any disclaimer, the term of this patent is extended or adjusted under 35 U.S.C. 154(b) by 812 days.

(21) Appl. No.: 12/778,584

(22) Filed: May 12, 2010

(65) Prior Publication Data

US 2010/0289816 A1 Nov. 18, 2010

Related U.S. Application Data

(60) Provisional application No. 61/215,935, filed on May 12, 2009.

(51) Int. Cl.
*G06K 9/40* (2006.01)
*G06K 9/32* (2006.01)
*G06K 9/48* (2006.01)

(52) U.S. Cl.
USPC ............ 382/269; 382/199; 382/263; 382/299

(58) Field of Classification Search
USPC .......................................... 382/199, 263, 299
See application file for complete search history.

(56) References Cited

U.S. PATENT DOCUMENTS 6,608,632 B2 * 8/2003 Daly et al. .................... 345/698
7,046,256 B2 5/2006 Credelle
7,149,355 B2 * 12/2006 Kubota ......................... 382/199
7,203,234 B1 * 4/2007 Zeng ........................ 375/240.03
7,349,028 B2 * 3/2008 Neuman et al. ............... 348/448
7,406,208 B2 * 7/2008 Chiang ......................... 382/266
7,440,635 B2 * 10/2008 Tan et al. ...................... 382/268
7,590,288 B1 * 9/2009 Alvarez et al. ................ 382/199
7,817,872 B2 * 10/2010 Michel et al. ................. 382/266
7,929,032 B2 * 4/2011 Tajima et al. ................. 348/246
8,135,174 B2 * 3/2012 Wiedemann et al. ......... 382/103
8,345,063 B2 * 1/2013 Iourcha et al. ................ 345/611
2004/0145599 A1 * 7/2004 Taoka et al. ................... 345/698
2007/0292022 A1 * 12/2007 Nilsson et al. ................ 382/167

OTHER PUBLICATIONS

Rudolph J. Guttosch, et al. Investigation of Color Aliasing of High Spatial Frequencies and Edges for Bayer-Pattern Sensors and Foveon X3(R) Direct Image Sensors. http//www.foveon.com. Last accessed on May 1, 2010, pp. 8.

(Continued)

*Primary Examiner* — Utpal Shah
(74) *Attorney, Agent, or Firm* — Amin, Turocy & Watson, LLP

(57) ABSTRACT

Systems, methods, and apparatus for sampling images using edge detection are presented herein. A gradient component can calculate at least one gradient of a luminance of a block of pixels based on at least one direction; and select a minimum gradient of the at least one gradient of the luminance. Further, a direction component can determine a direction of the block based on a direction of the minimum gradient of the at least one gradient of the luminance. Moreover, a sampling component can alternately select subpixels of the block based on the direction of the block. In addition, a filter component can calculate at least one gradient of a color of a subpixel of the subpixels based on the at least one direction; determine a direction of the subpixel based on the at least one gradient of the color; and filter the subpixels based on the direction of the subpixel.

27 Claims, 21 Drawing Sheets

(56) References Cited

OTHER PUBLICATIONS

John C. Platt, Optimal Filtering for Patterned Displays. Technical Report MSR-TR-2000-10. Last accessed on Aug. 4, 2010, pp. 8.

Dean S. Messing, et al. Improved Display Resolution of Subsampled Colour Images Using Subpixel Addressing. Last accessed on Aug. 5, 2010, pp. 4.

Claude Betrisey, et al., Displaced Filtering for Patterned Displays. Last accessed on Aug. 4, 2010, pp. 4.

Tony Lindeberg, Edge detection and ridge detection with automatic scale selection. http://www.nada.kth.se/tony. Last accessed on Apr. 29, 2010, pp. 48.

Colin Ware, Color Sequences for Univariate Maps: Theory, Experiments, and principles. IEEE Computer Graphics and Applications, Sep. 1988, 41-49. Last accessed on May 1, 2010, pp. 11.

Jun-Seong Kim, et al., A Filter Design Algorithm for Subpixel Rendering on Matrix Displays. (C)2007 EURASIP; EUSIPCO, Poznan 2007. Last accessed on Apr. 29, 2010, pp. 5.

Studio Encoding Parameters of Digital Television for Standard 4:3 and Wide-Screen 16:9 Aspect Ratios. Rec. ITU-R BT.601-5. Last accessed on Aug. 4, 2010, pp. 16.

Longin Jan Latecki "Sliding Window Filters and Edge Detection", Computer Graphics and Imaging Processing, CIS 601—Fall 2004, 37 pages.

Steve Gibson, "Sub-Pixel Font Rendering Technology", http://www.grc.com/cleartype.htm, 2010, 2 pages.

* cited by examiner

400

420 $Grad^{H}(Y_{3i-1,3j-1}) = |Y_{3i-1,3j} - Y_{3i-1,3j-1}| + |Y_{3i-1,3j-1} - Y_{3i-1,3j-2}|$ 430 $Grad^{V}(Y_{3i-1,3j-1}) = |Y_{3i,3j-1} - Y_{3i-1,3j-1}| + |Y_{3i-2,3j-1} - Y_{3i-1,3j-1}|$ 440 $Grad^{LD}(Y_{3i-1,3j-1}) = |Y_{3i,3j} - Y_{3i-1,3j-1}| + |Y_{3i-1,3j-1} - Y_{3i-2,3j-2}|$ 450 $Grad^{RD}(Y_{3i-1,3j-1}) = |Y_{3i,3j-2} - Y_{3i-1,3j-1}| + |Y_{3i-1,3j-1} - Y_{3i-2,3j}|$ 720
$$Grad^{H}(G_{3i-1,3j-1}) = |G_{3i-1,3j} - G_{3i-1,3j-1}| + |G_{3i-1,3j-1} - G_{3i-1,3j-2}|$$

730
$$Grad^{V}(G_{3i-1,3j-1}) = |G_{3i,3j-1} - G_{3i-1,3j-1}| + |G_{3i-2,3j-1} - G_{3i-1,3j-1}|$$

740
$$Grad^{LD}(G_{3i-1,3j-1}) = |G_{3i,3j} - G_{3i-1,3j-1}| + |G_{3i-1,3j-1} - G_{3i-2,3j-2}|$$

750
$$Grad^{RD}(G_{3i-1,3j-1}) = |G_{3i,3j-2} - G_{3i-1,3j-1}| + |G_{3i-1,3j-1} - G_{3i-2,3j}|$$

ADAPTIVE SUBPIXEL-BASED DOWNSAMPLING AND FILTERING USING EDGE DETECTION

CROSS REFERENCE TO RELATED APPLICATIONS

This application claims priority to U.S. Provisional Patent Application Ser. No. 61/215,935, filed on May 12, 2009, entitled "A NEW ADAPTIVE SUBPIXEL-BASED DOWN-SAMPLING SCHEME USING EDGE DETECTION", the entirety of which is incorporated by reference herein.

TECHNICAL FIELD

This disclosure relates generally to image processing including, but not limited to, adaptive subpixel-based downsampling and filtering using edge detection.

BACKGROUND

With the advance of portable technologies, downsampling of high resolution image information is often required to display high resolution images(s) and/or video(s) on lower resolution devices, e.g., handheld devices, such as cellular phones, portable multimedia players (PMPs), personal data assistants (PDAs), etc.

A color pixel of a high resolution matrix display, e.g. liquid crystal display (LCD), plasma display panel (PDP), etc. includes three subpixels, each subpixel representing one of three primary colors, i.e., red (R), green (G), and blue (B). Although the subpixels are not separately visible, they are perceived together as color(s). One conventional technique for downsampling a high resolution, e.g., color, image is pixel-based downsampling, which selects every third pixel of the high resolution image to display. Such downsampling severely affects shapes and/or details of the image, as over 30% of information of the image is compressed (or lost). Further, pixel-based downsampling causes aliasing, or distortion, of the image near shape edges.

Another conventional technique for downsampling high resolution images is subpixel-based downsampling, which alternately selects red, green, and blue subpixels from consecutive pixels of a high resolution image in the same, i.e., horizontal, direction. As such, the (i,j) pixel in the down-sampled image includes subpixels ($R_{i,j}$, $G_{i,j+1}$, $B_{i,j+1}$)—the subscripts denoting pixel indices of the input, i.e., high resolution, image. Although such subpixel-based downsampling preserves the shapes of images more effectively than pixel-based downsampling, resulting subpixel-based images incur more color fringing, i.e., artifacts, around non-horizontal edges than pixel-based downsampled images.

The above-described deficiencies of today's wireless communication networks and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above identified deficiencies of today's image processing environments and other drawbacks of conventional image sampling environments, various systems, methods, and apparatus described herein adaptively sample and/or filter subpixels of an image using edge detection.

For example, a method can include calculating a luminance gradient of a block of pixels in four directions; determining an edge direction of the block based on the calculating; and selecting subpixels of the block of pixels based on the edge direction of the block.

In another example, a system can include a gradient component configured to calculate at least one gradient of a luminance of a block of pixels based on at least one direction; and select a minimum gradient of the at least one gradient of the luminance. Further, the system can include a direction component configured to determine a direction of the block based on a direction of the minimum gradient of the at least one gradient of the luminance. In addition, the system can include a sampling component configured to alternately select subpixels of the block based on the direction of the block.

In yet another example, a method can include calculating a gradient of a luminance value of a block of at least two blocks of pixels in at least one direction; determining an edge direction of the block based on the calculating the gradient of the luminance value; and selecting subpixels of the block based on the edge direction of the block.

In one example, an apparatus can include means for selecting a block of pixels from image information; means for determining a minimum gradient of a luminance of the block based on four edge directions of the block; and means for sampling subpixels of the block based on the means for the determining the minimum gradient of the luminance.

In another example, the apparatus can include means for determining a minimum gradient of a color of a subpixel of the subpixels based on the four edge directions; and means for filtering the subpixels based on the means for the determining the minimum gradient of the color.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
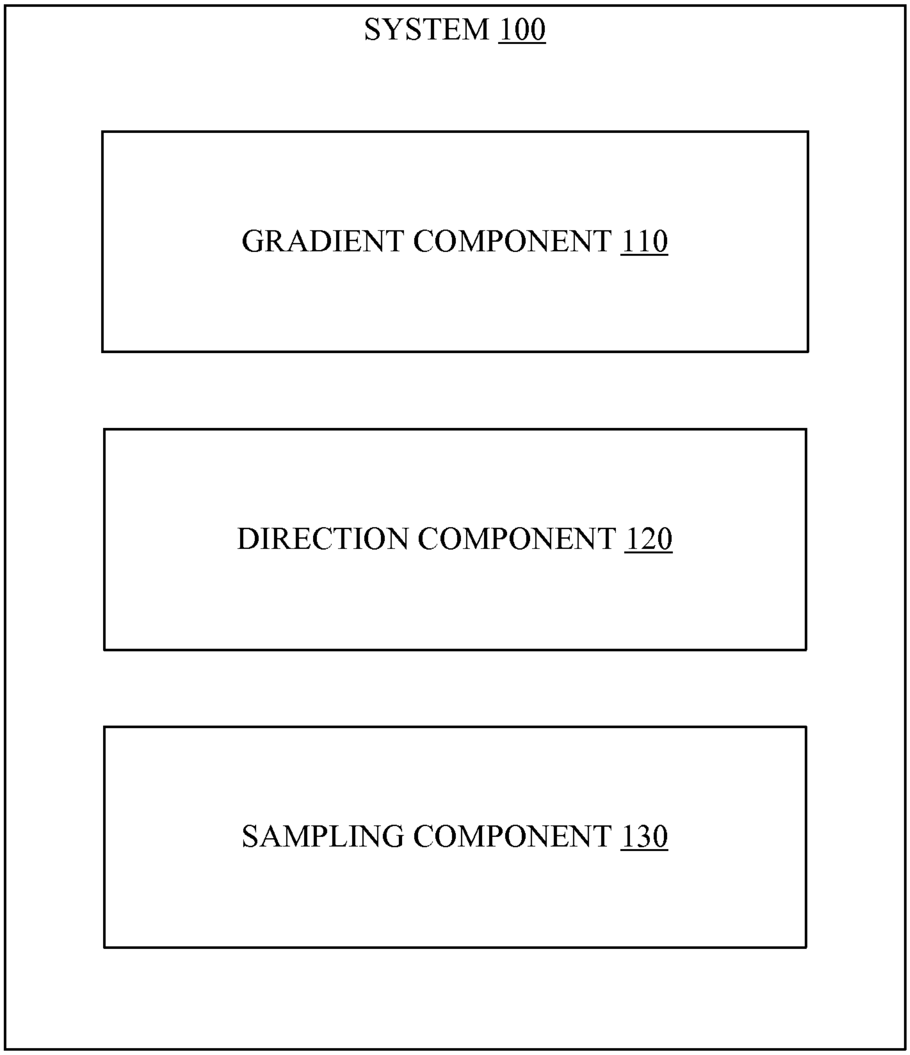
FIG. 1 illustrates a block diagram of an adaptive subpixel-based downsampling system, in accordance with an embodiment.

Various non-limiting embodiments of systems, methods, and apparatus presented herein adaptively sample and/or filter subpixels of an image using edge detection.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to automatically calculate, e.g., via gradient component 110, a luminance gradient of a block of pixels in four directions; determine, e.g., via direction component 120, an edge direction of the block based on the calculating; and select, e.g., via sampling component 130, subpixels of the block of pixels based on the edge direction of the block. Further, the artificial intelligence system can be used to automatically compute, e.g., via a filter component, a color gradient, in the four directions, of a subpixel of the subpixels; determine an edge direction of the subpixel based on the computing; and filter the subpixels based on the edge direction of the subpixel.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Conventional downsampling techniques negatively affect shapes and/or details of a sampled image, causing aliasing of the sampled image near shape edges, and/or causing increased color fringing around non-horizontal edges of the sampled image. Compared to such technology, various systems, methods, and apparatus described herein in various embodiments can improve sampling of images by adaptively sampling and/or filtering subpixels of such images using edge detection.

Referring now to FIG. 1, a block diagram of an adaptive subpixel-based downsampling system 100 is illustrated, in accordance with an embodiment. Aspects of system 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Figure 2:
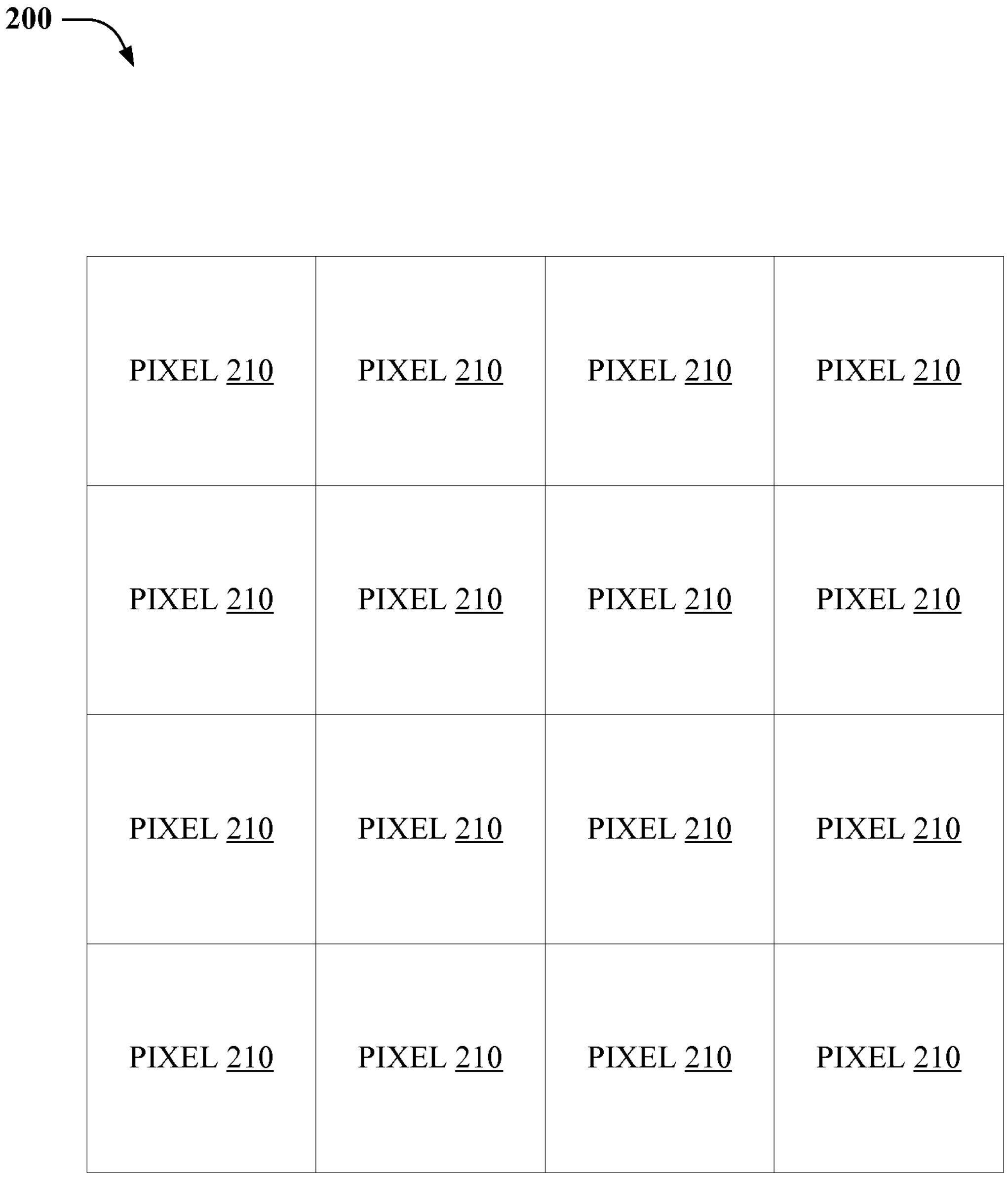
FIG. 2 illustrates a block diagram of a two-dimensional high resolution image, in accordance with an embodiment.

As illustrated by FIG. 1, system 100 can include gradient component 110, direction component 120, and sampling component 130. As described above, downsampling is a procedure used to display high resolution images/video on lower resolution devices. FIG. 2 illustrates a block diagram of a two-dimensional high resolution image 200, in accordance with an embodiment. High resolution image 200 includes pixels 210, which are addressable screen elements of a display, arranged in a 2-dimensional grid. Each pixel 210 is addressed by coordinates (not shown), which can be arbitrarily assigned and/or re-assigned during image processing.

Figure 3:
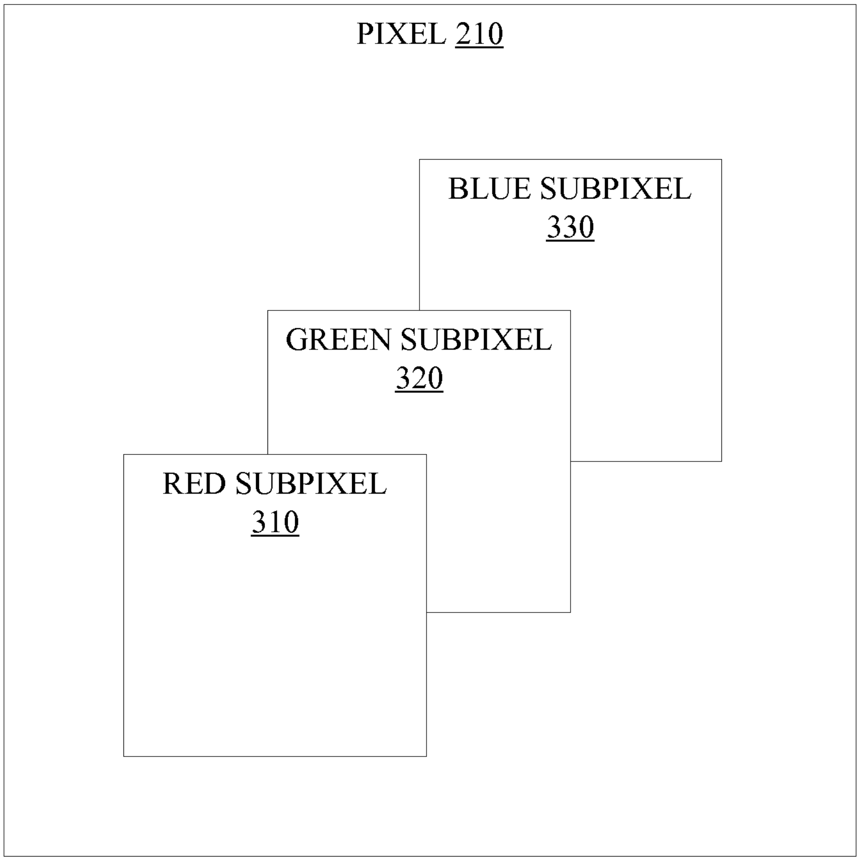
FIG. 3 illustrates a block diagram of a pixel, in accordance with an embodiment.
Figure 4:
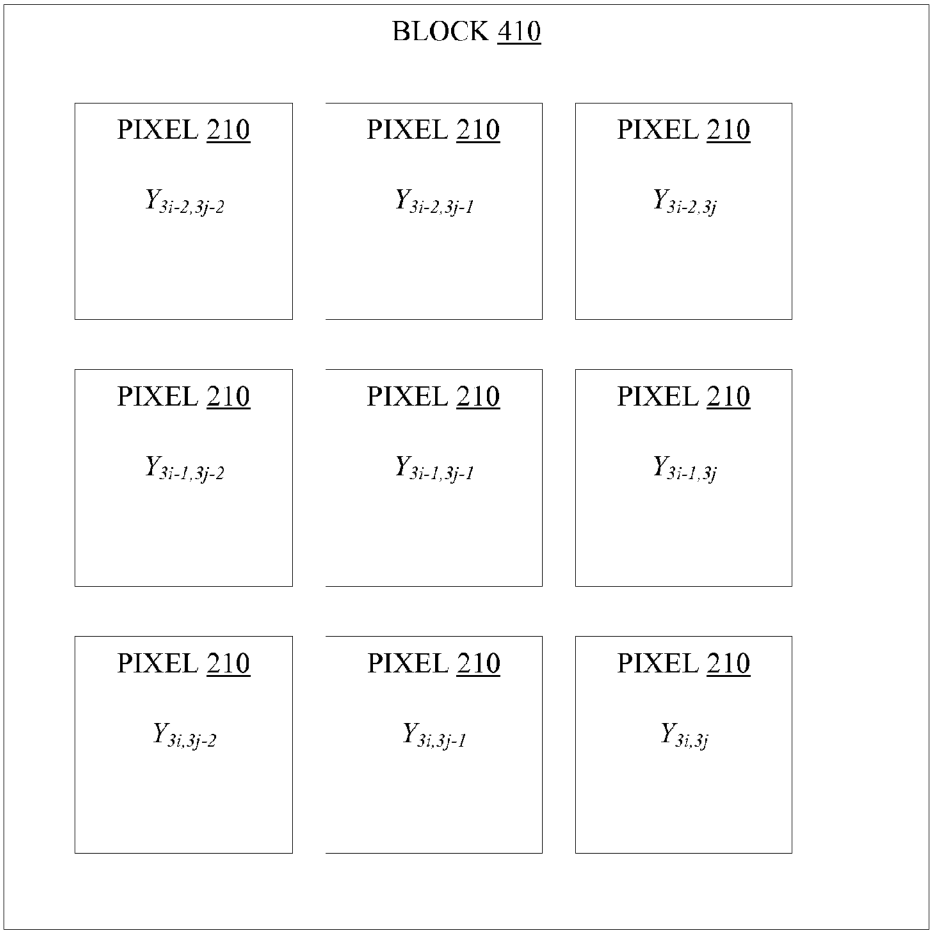
FIG. 4 illustrates a block diagram of an adaptive subpixel-based downsampling model, in accordance with an embodiment.

FIG. 3 illustrates a block diagram of pixel 210, in accordance with an embodiment. As illustrated by FIG. 3, pixel 210 can include three subpixels: red subpixel 310, green subpixel 320, and blue subpixel 330. Subpixels 310, 320, and 330, which together represent color when perceived at a distance, are also addressed by coordinates. A color of a pixel 210 can be described by two values: luminance (brightness) and chrominance (color). YUV is a color space that encodes a color image and/or video into luminance and chrominance (UV) components, or information. In an aspect illustrated by FIG. 4, gradient component 110 can be configured to calculate at least one gradient of a luminance (Y) of block 410 of pixels 210 based on at least one direction, in accordance with an embodiment. The at least one gradient of the luminance is a change in luminance with direction.

In one aspect, gradient component 110 can be configured to calculate, based on coordinates assigned to pixels 210, the at least one gradient of the luminance in a horizontal (H) direction (see equation 420—$Grad^H(Y_{3i-1,3j-1})=|Y_{3i-1,3j}-Y_{3i-1,3j-1}|+|Y_{3i-1,3j-1}-Y_{3i-1,3j-2}|$), a vertical (V) direction (see equation 430—$Grad^V(Y_{3i-1,3j-1})=|Y_{3i,3j-1}-Y_{3i-1,3j-1}|+|Y_{3i-2,3j-1}-Y_{3i-1,3j-1}|$), a left diagonal (LD) direction (see equation 440—$Grad^{LD}(Y_{3i-1,3j-1})=|Y_{3i,3j}-Y_{3i-1,3j-1}|+|Y_{3i-1,3j-1}-Y_{3i-2,3j-2}|$) and a right diagonal (RD) direction (see equation 450—$Grad^{RD}(Y_{3i-1,3j-1})=|Y_{3i,3j-2}-Y_{3i-1,3j-1}|+|Y_{3i-1,3j-1}-Y_{3i-2,3j}|$). In an aspect, gradient component 110 can associate coordinates (i,j) with the block of pixels, and subsequently selected blocks of pixels, to calculate the at least one gradient of the luminance of the block of pixels.

Further, gradient component 110 can be configured to select a minimum gradient of the at least one gradient of the luminance. Moreover, direction component 120 can be configured to determine, or select, a direction of block 410 based on a direction of the minimum gradient of the at least one gradient of the luminance. In an aspect, direction component 120 can select the direction of the block as the direction of the minimum gradient. For example, referring now to FIG. 5, an environment 500 for adaptively downsampling a block of pixels is illustrated, in accordance with an embodiment.

Figure 5:
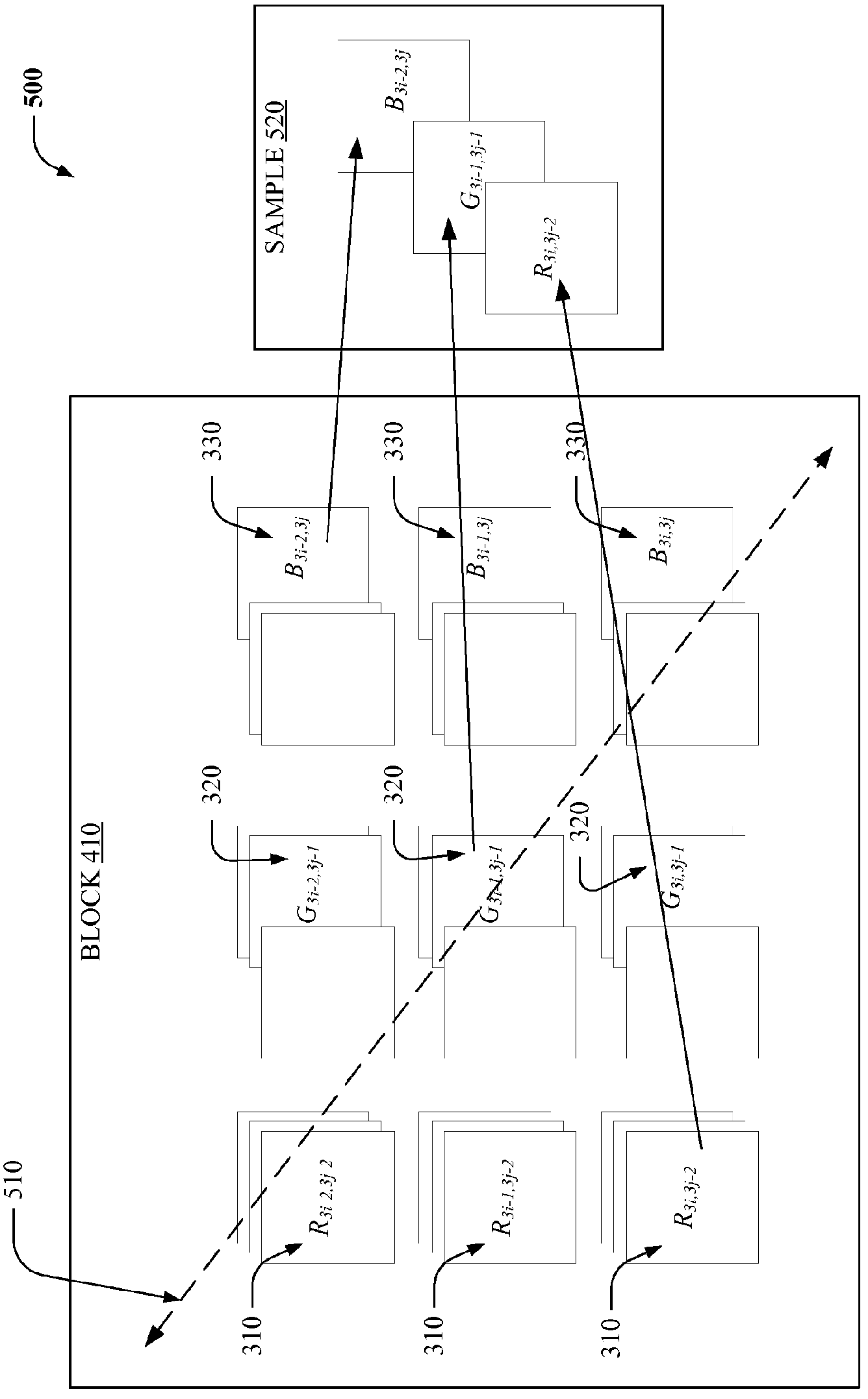
FIG. 5 illustrates adaptively downsampling a block of pixels, in accordance with an embodiment.

As illustrated by FIG. 5, direction 510 (left diagonal direction) of block 410 was selected by direction component 120 as the direction of block 410—based on the minimum gradient, e.g., since gradient component 110 selected the minimum gradient of the at least one gradient of the luminance utilizing equation 440. Sampling component 130 can be configured to alternately select, e.g., adjacent, subpixels (310, 320, 330) of block 410 based on the direction of block 410. In an aspect illustrated by FIG. 5, sampling component 130 is configured to alternately select subpixels in a direction opposite the direction of the block. As such, sampling component 130 selected subpixels of sample 520 in a right diagonal direction—selecting subpixels red subpixel 310 at coordinate $R_{3i,3j-2}$, green subpixel 320 at coordinate $G_{3i-1,3j-1}$, and blue subpixel 330 at coordinate $B_{3i-2,3j}$. As such, system 100 can preserve shape details of a high resolution image at a higher resolution.

Figure 6:
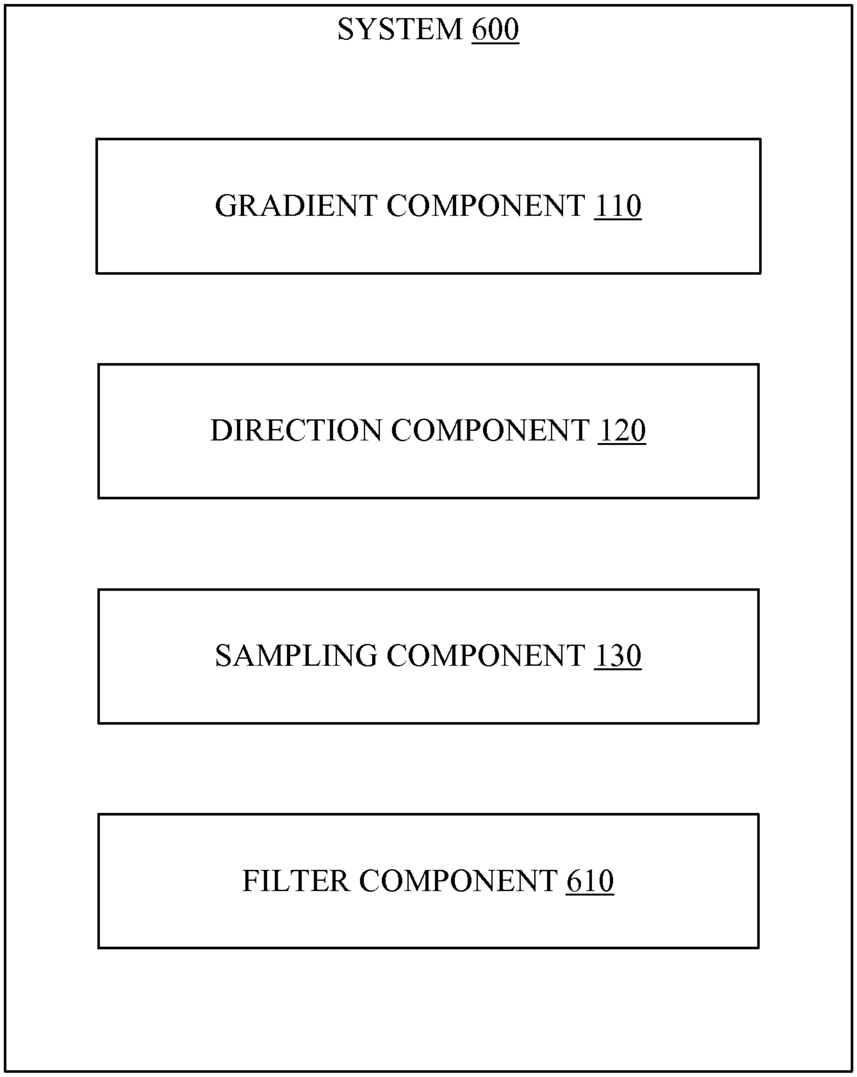
FIG. 6 illustrates a block diagram of an adaptive subpixel-based downsampling and filtering system, in accordance with an embodiment.
Figure 7:
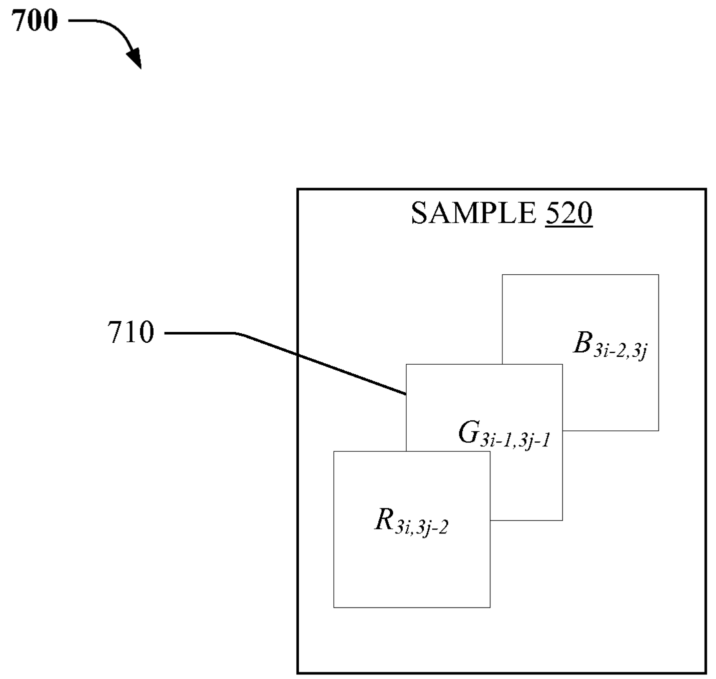
FIG. 7 illustrates a filter environment utilizing an adaptive subpixel-based sampling model, in accordance with an embodiment.

Now referring to FIG. 6, a block diagram of an adaptive subpixel-based downsampling and filtering system 600 is illustrated, in accordance with an embodiment. System 600 can include filter component 610, which can be configured to calculate at least one gradient of a color of a subpixel of the subpixels, e.g., sample 520, based on a direction, e.g., 510, of the block (410). In an aspect illustrated by FIG. 7, a filter environment 700 can include a filter component 610 (not shown) that can be configured to calculate gradients 720, 730, 740, and 750 of the color, e.g., green, of a subpixel (720) in a horizontal (H) direction (see equation 720—$Grad^H(G_{3i-1,3j-1})=|G_{3i-1,3j}-G_{3i-1,3j-1}|+|G_{3i-1,3j-1}-G_{3i-1,3j-2}|$), a vertical (V) direction (see equation 730—$Grad^V(G_{3i-1,3j-1})=|G_{3i,3j-1}-G_{3i-1,3j-1}|+|G_{3i-2,3j-1}-G_{3i-1,3j-1}|$), a left diagonal (LD) direction (see equation 740—$Grad^{LD}(G_{3i-1,3j-1})=|G_{3i,3j}-G_{3i-1,3j-1}|+|G_{3i-1,3j-1}-G_{3i-2,3j-2}|$), and a right diagonal (RD) direction (see equation 750—$Grad^{RD}(G_{3i-1,3j-1})=|G_{3i,3j-2}-G_{3i-1,3j-1}|+|G_{3i-1,3j-1}-G_{3i-2,3j}|$), respectively. In one aspect, filter component 610 can associate coordinates (i,j) with the subpixel (and subsequently selected subpixels) to calculate the at least one gradient of the color of the subpixel.

In another aspect, filter component 610 can be configured to determine a minimum gradient of the at least one gradient of the color; and determine a direction of the subpixel based on the at least one gradient of the color. For example, filter component 610 can be configured to select the direction of the subpixel associated with a direction related to the minimum gradient of the at least one gradient of the color. Further filter component 610 can be configured to filter the subpixels based on the direction of the subpixel. For example, filter component 610 can be configured to filter the subpixels in a direction opposite the direction of the subpixel.

In another aspect, filter component 610 can be configured to select a low pass filter associated with an infinite sinc function (or infinite impulse response). For example, filter component 610 can be configured to select a cut-off frequency of the low pass filter between $\pi/3\sim\pi$. In another aspect, filter component 610 can select the cut-off frequency as $5\pi/6$.

Figure 8:
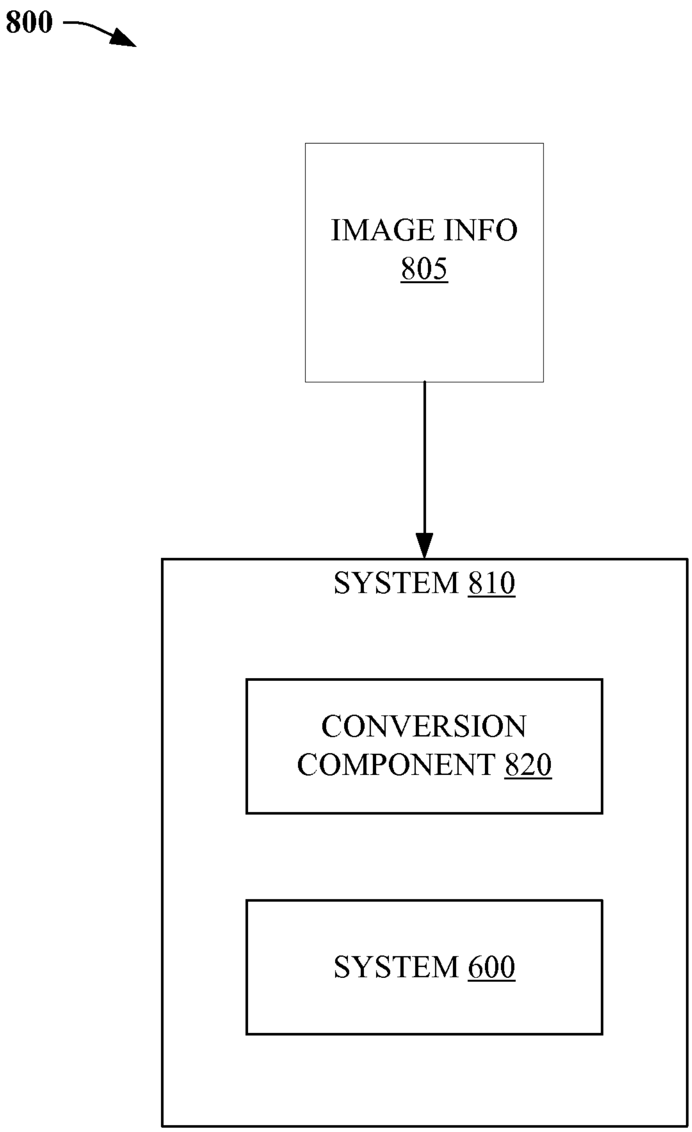
FIG. 8 illustrates a block diagram of an adaptive subpixel-based downsampling and filtering environment, in accordance with an embodiment.

FIG. 8 illustrates a block diagram of an adaptive subpixel-based downsampling and filtering environment 800 including a system 810, in accordance with an embodiment. System 810 that can receive image info 805, which can include additive color domain (ACD) information, e.g., red-green-blue (RGB) information, and or opponent color domain (OCD) information). Conversion component 820 can convert, sample, process, etc. image info 805 into OCD, e.g., YUV information, or into RGB information, based on image processing methods including sampling and/or splitting image info 805 utilizing analog and/or digital filter, and/or associated processing, techniques, e.g., via digital signal processors, discrete and/or digital circuits, etc. Moreover, system 810 can include various storage medium(s) to store, in various state(s), image info 805, e.g., as ACD and/or OCD information. Further, system 810 can store blocks, e.g., 410, and samples, e.g., 520, selected and/or utilized by, e.g., gradient component 110, filter component 610, etc.

Figure 9:
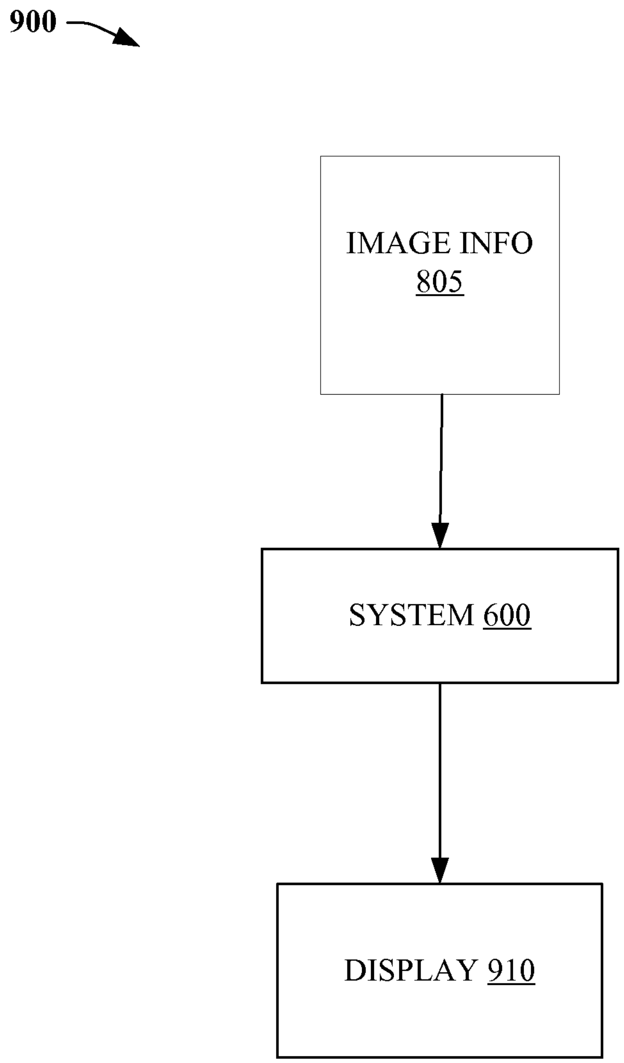
FIG. 9 illustrates a block diagram of a sampling environment including a display, in accordance with an embodiment.

Now referring to FIG. 9, a block diagram of a sampling environment 900 including a display 910 is illustrated, in accordance with an embodiment. System 600 can include a display interface component (not shown), that can couple to display 910 to display subpixels sampled, e.g., via sampling component 130, and/or filtered, e.g., via filter component 610. Display 910 can include LCD technology, PDP technology, etc. that can display subpixel-addressed data, e.g., generated via systems 100, 600, 810, etc.

FIGS. 10-20 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 10:
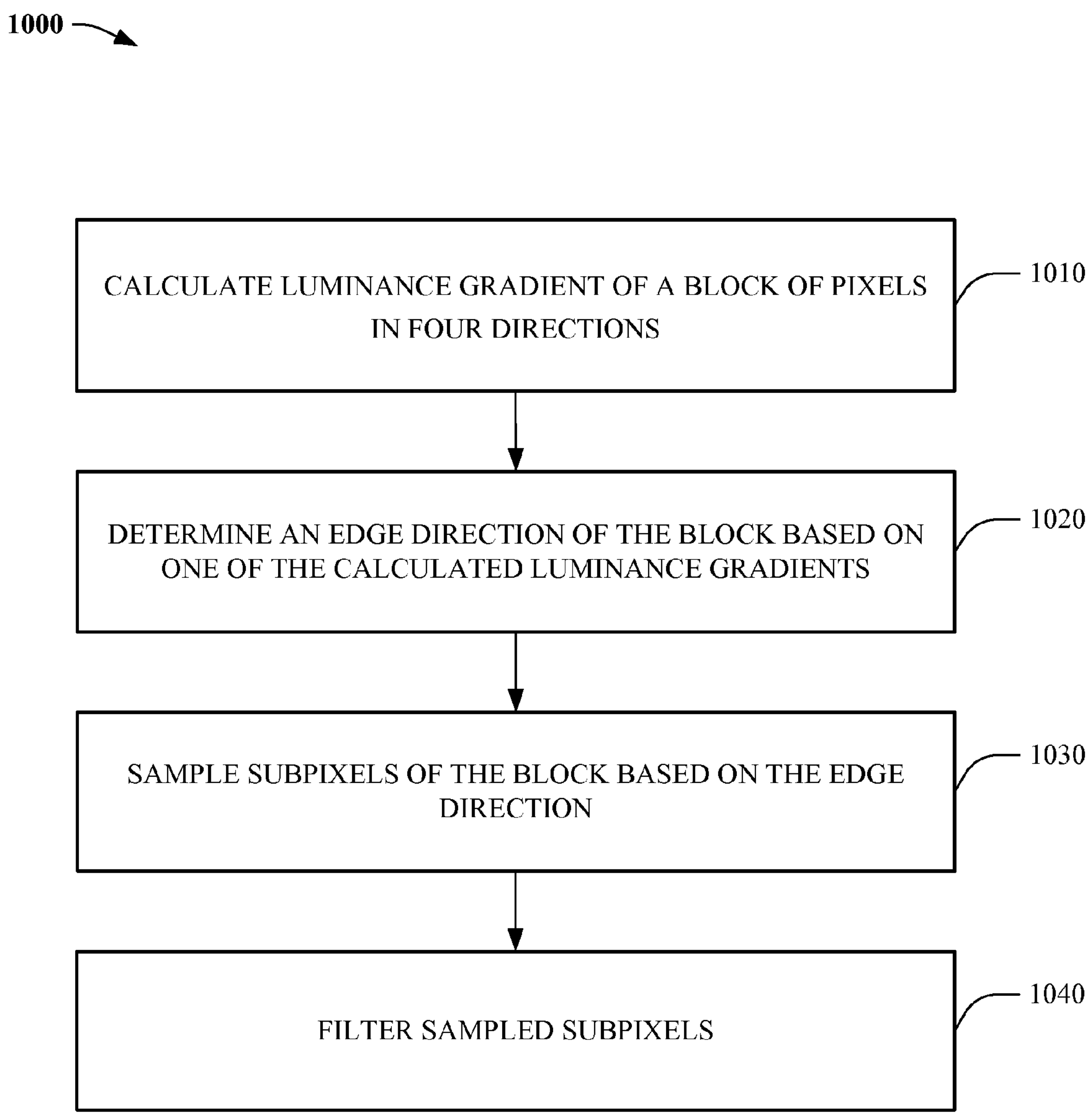
FIGS. 10-20 illustrate various processes associated with adaptive subpixel-based downsampling and/or filtering, in accordance with an embodiment.

Referring now to FIG. 10, a process 900 associated with adaptive subpixel-based downsampling and filtering is illustrated, in accordance with an embodiment. At 1010, a luminance gradient of a block of pixels, e.g., three-by-three block of nine pixels (block 410), can be calculated in four directions, e.g., via system 600, 810, etc. An edge direction of the block can be determined, or selected at 1020, based on one of the calculated luminance gradients, e.g., via system 600, 810, etc. At 1030, such system(s) can sample subpixels of the block based on the edge direction, and filter the sampled subpixels at 1040.

Figure 11:
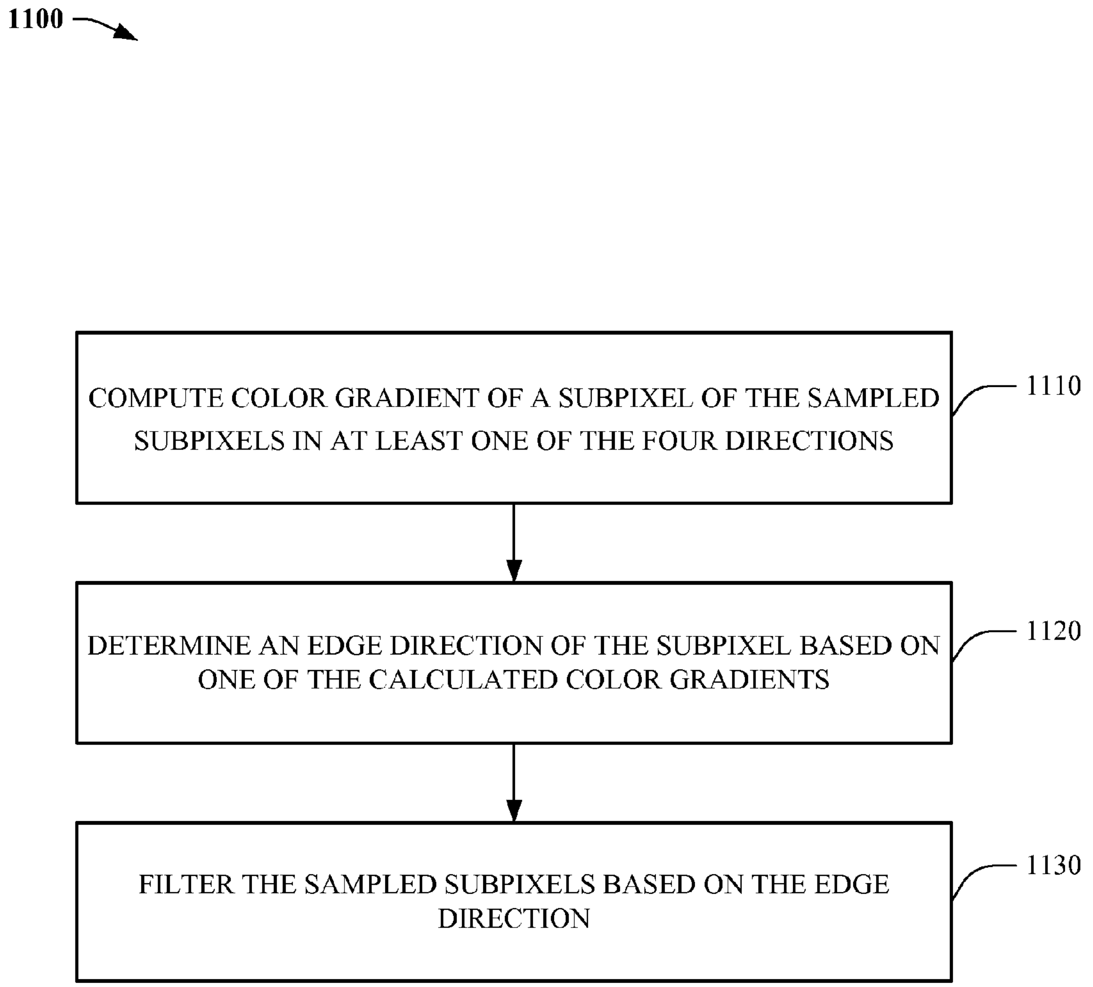
Figure 12:
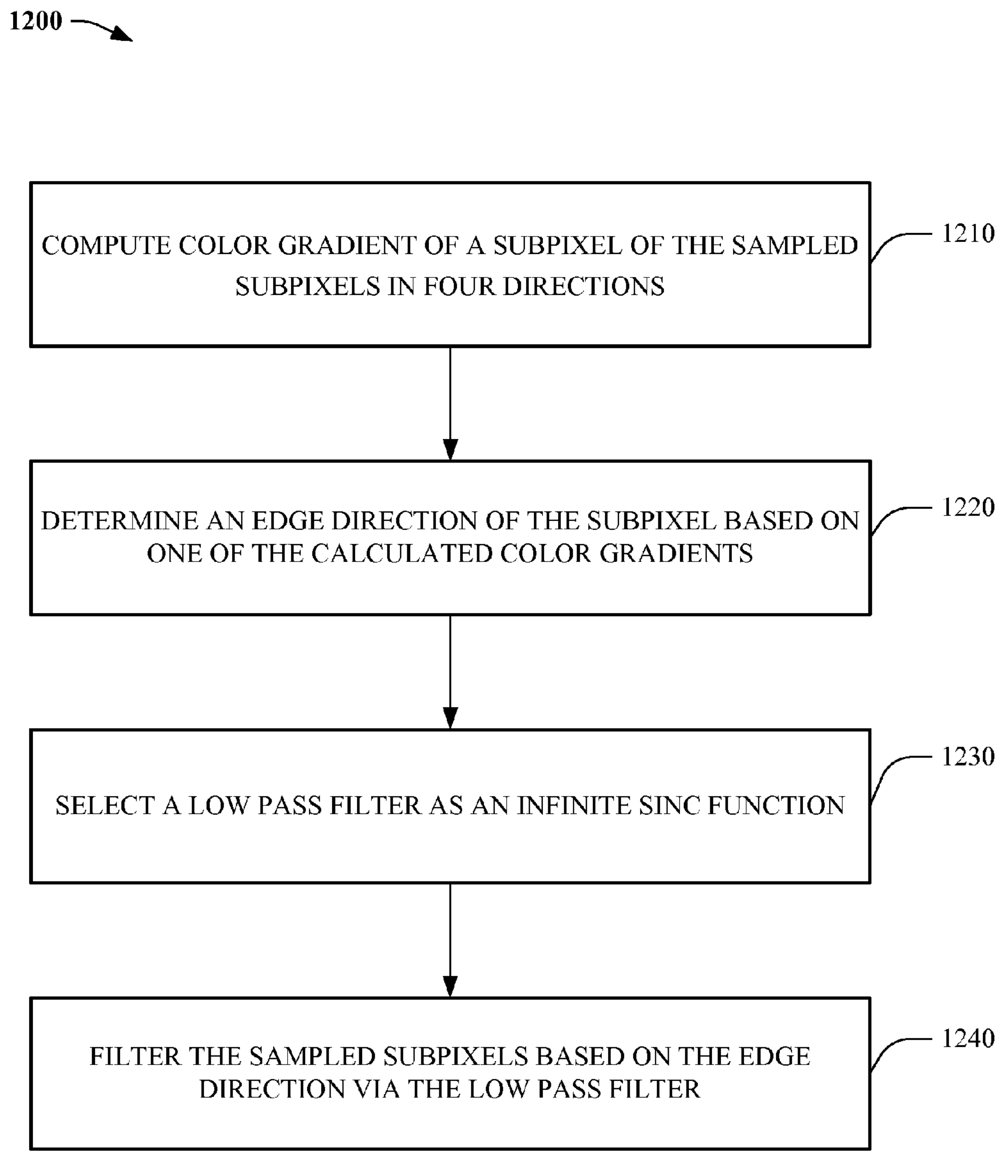

FIGS. 11 and 12 illustrate processes 1100 and 1200 for adaptive subpixel-based filtering, e.g., performed via system 600, 810, etc. in accordance with an embodiment. At 1110, such system(s) can compute a color gradient of a subpixel of the sampled subpixels, e.g., 520, in at least one of the four directions. In an aspect illustrated by FIG. 12, process 1200 can compute (at 1210) four color gradients, e.g., per filter environment 700, associated with a horizontal direction, a vertical direction, a left diagonal direction, and a right diagonal direction of the subpixel. At 1120 and 1220, processes 1100 and 1200 can determine an edge direction of the subpixel based on one of the calculated color gradients, e.g., by selecting a direction associated with a minimum color gradient of the computed color gradient(s). At 1130, process 1100 can filter subpixels sampled, e.g., at 1030, based on the determined edge direction of the subpixel. In an aspect, process 1100 can filter the subpixels based on a direction opposite the edge direction of the subpixel.

Now referring to FIG. 12, in another aspect, process 1200 can select, at 1230, a low pass filter as an infinite sinc function, e.g., with infinite impulse response. For example, process 1100 can select a cut-off frequency of the low pass filter between $\pi/3\sim\pi$. In another aspect, filter component 610 can select the cut-off frequency as $5\pi/6$. At 1240, process 1200 can filter the subpixels based on the edge direction via the low pass filter.

Figure 13:
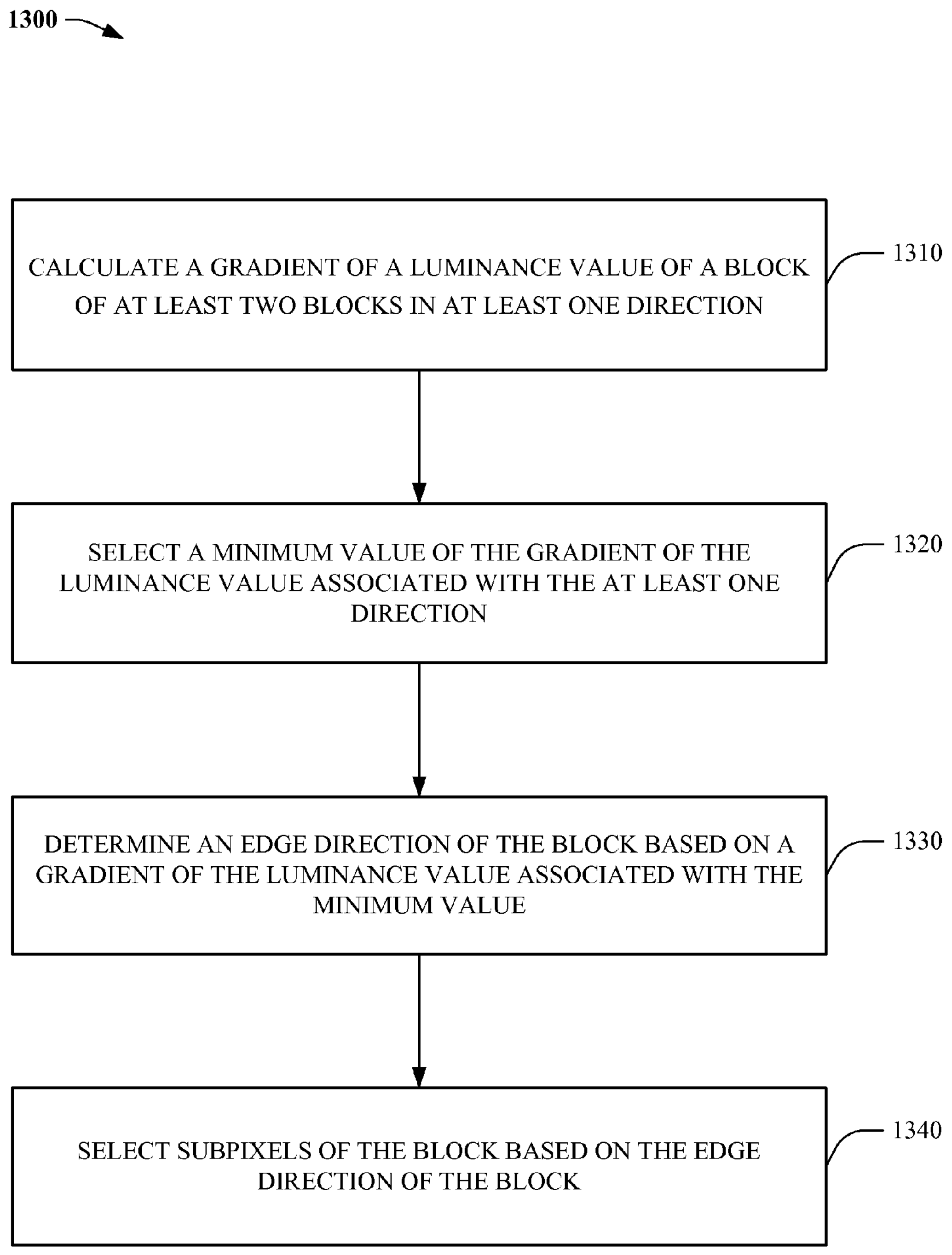

FIG. 13 illustrates a process 1300 associated with adaptive subpixel-based downsampling, e.g., performed via system 100, 600, 810, 910, etc. in accordance with an embodiment. At 1310, a gradient of a luminance value of a block, e.g., 410, of at least two blocks, e.g., of two-dimensional high resolution image 200, can be calculated in at least one direction. At 1320, a minimum value of the gradient of the luminance value associated with the at least one direction can be selected. An edge direction of the block can be determined at 1330 based on the selected minimum value. In an aspect, the edge direction of the block can be selected as the direction of the gradient associated with the selected minimum value. At 1340, subpixels of the block can be selected based on the edge direction. In an aspect, subpixels of the block can be selected—in order of red, green, and blue subpixels of adjacent pixels—in a direction opposite the edge direction.

Figure 14:
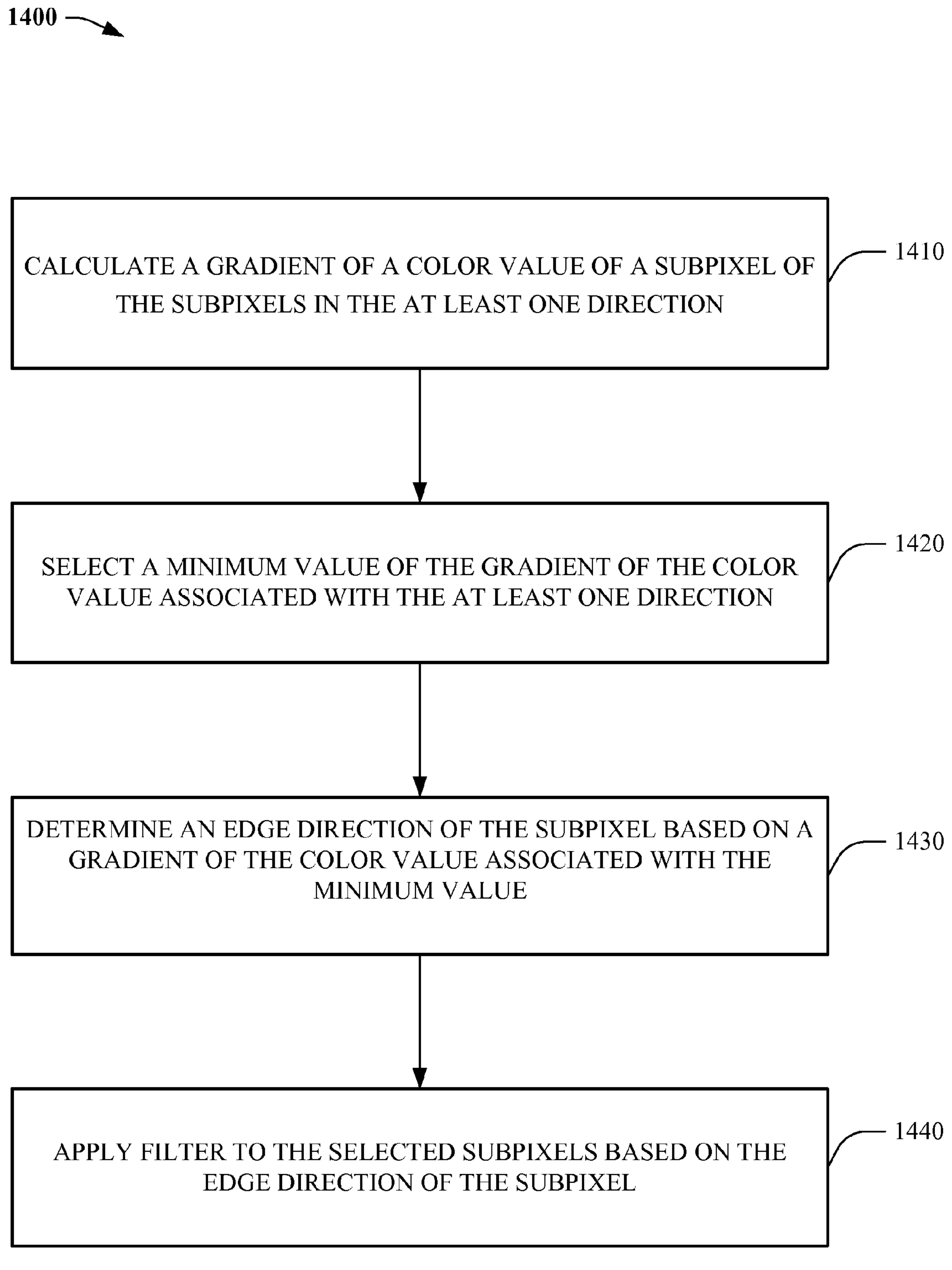

FIG. 14 illustrates a process 1400 associated with adaptive subpixel-based filtering, e.g., performed via system 600, 810, etc. in accordance with an embodiment. At 1410, a gradient of a color value of a subpixel of the subpixels, e.g., of sample 520, can be calculated in at least one direction. At 1420, a minimum value of the gradient of the color value associated with the at least one direction can be selected. An edge direction of the subpixel can be determined at 1430 based on a direction of the gradient associated with the selected minimum value (of the gradient of the color value). At 1440, subpixels of the block can be filtered based on the edge direction of the subpixel. In an aspect, an opponent channel of the subpixel can be filtered in a direction opposite the edge direction.

Figure 15:
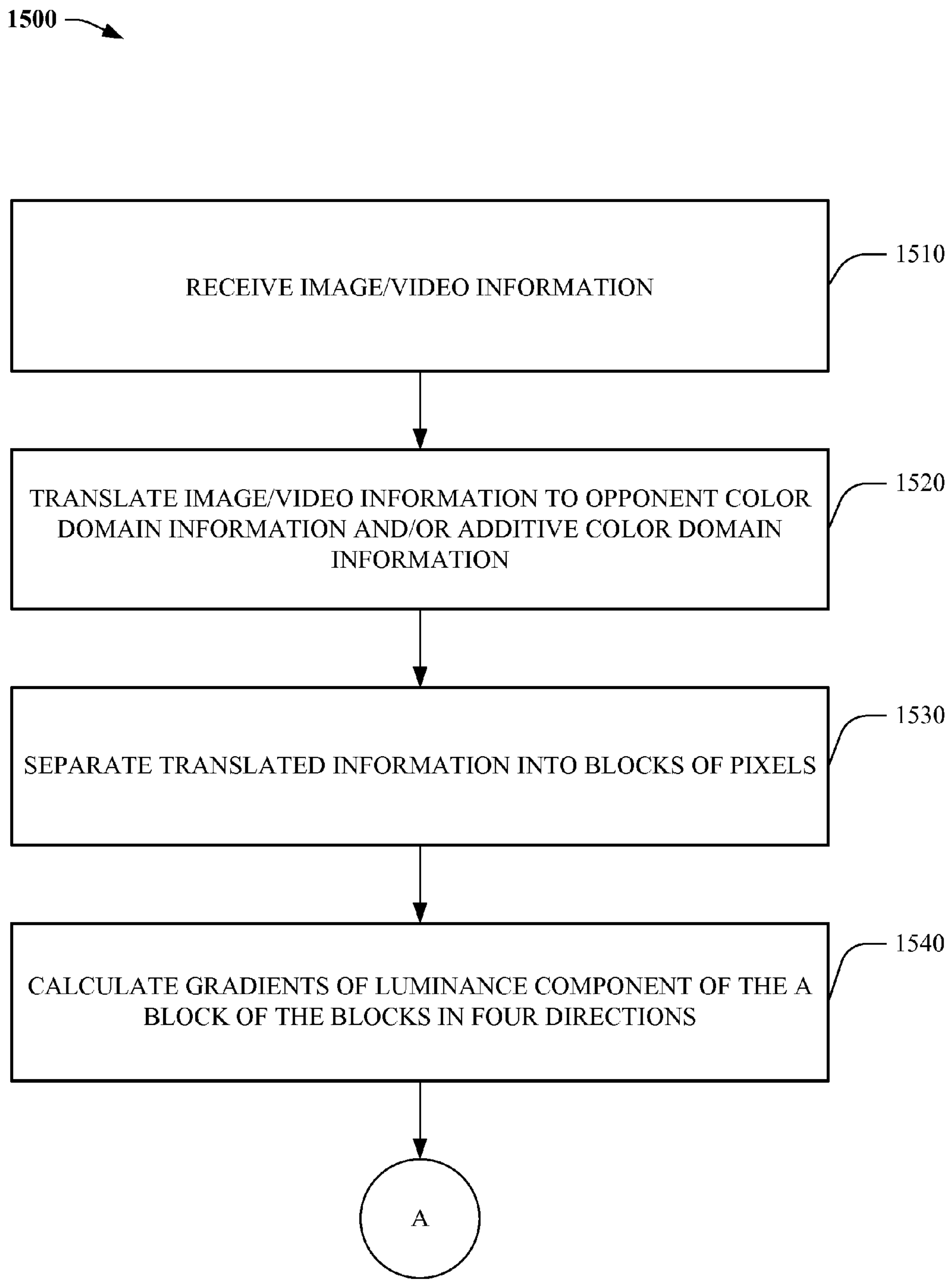
Figure 16:
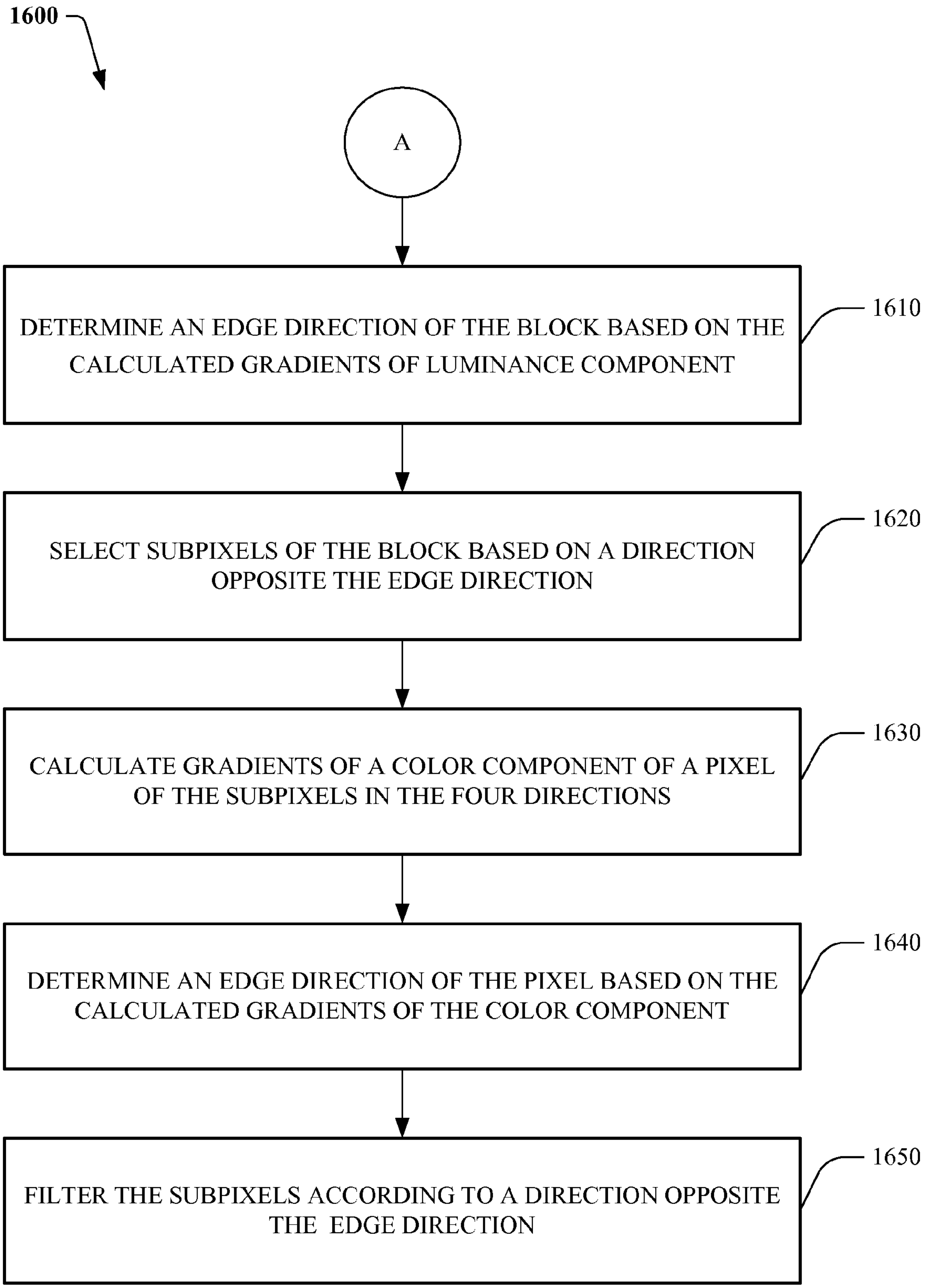
Figure 17:
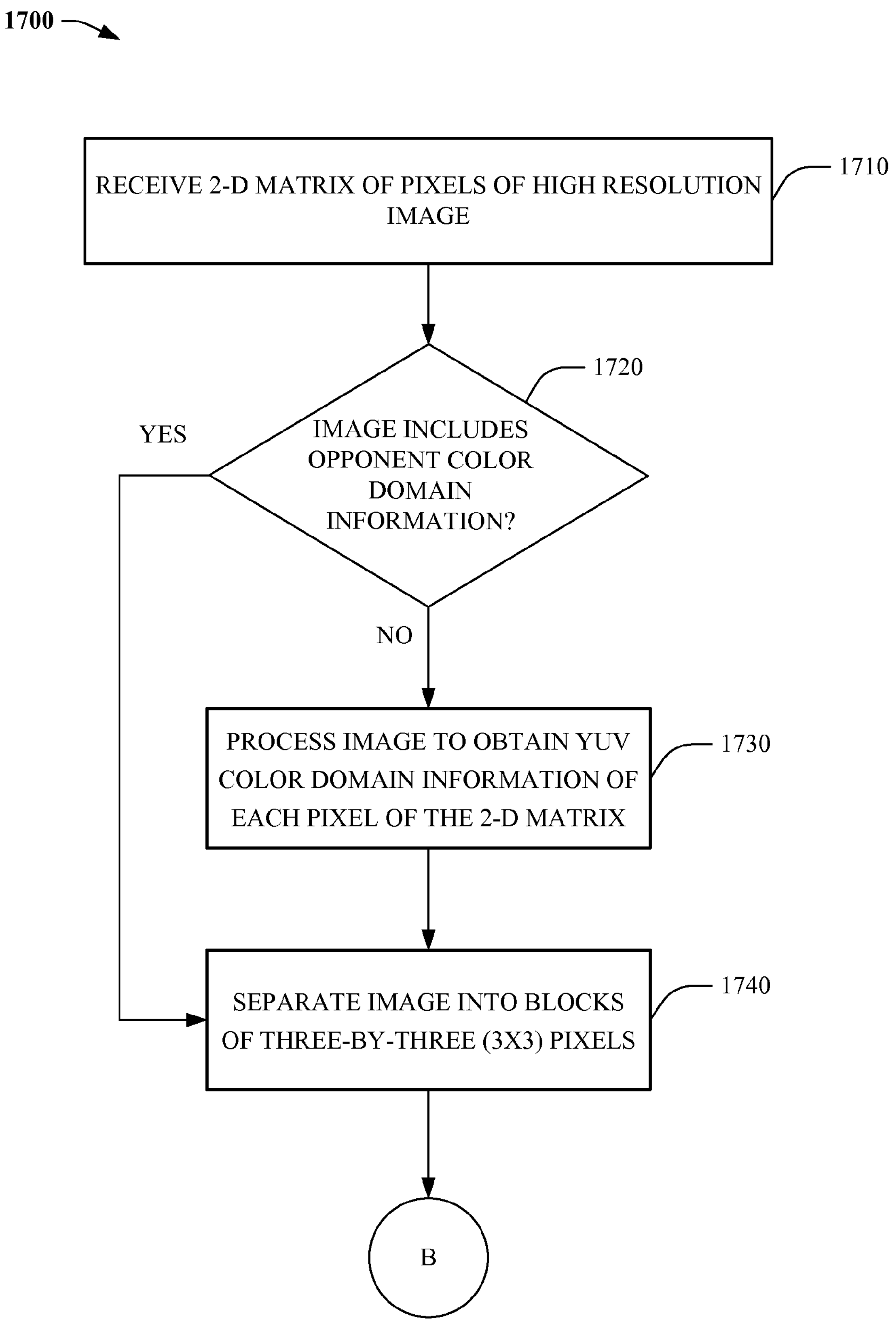
Figure 18:
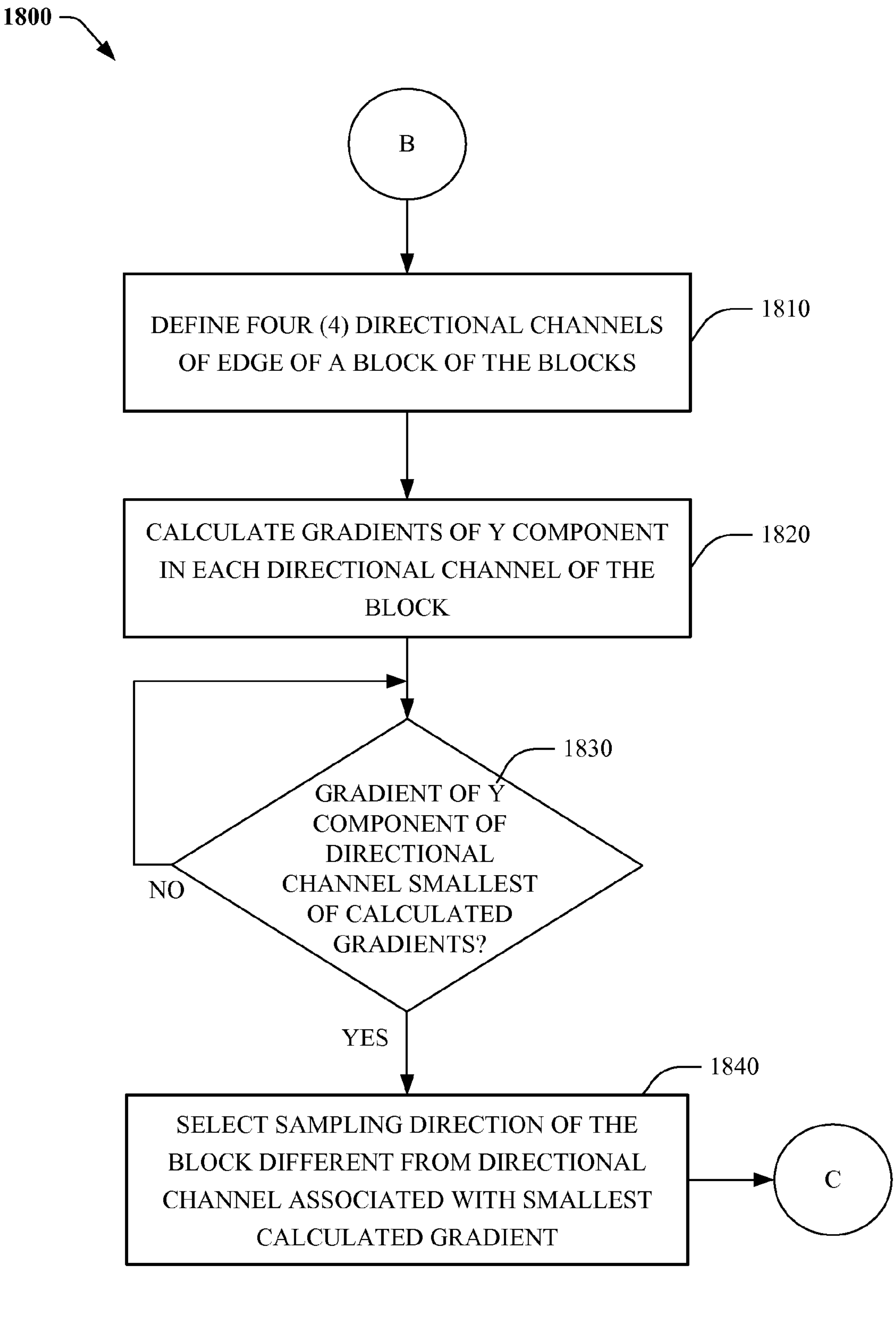
Figure 19:
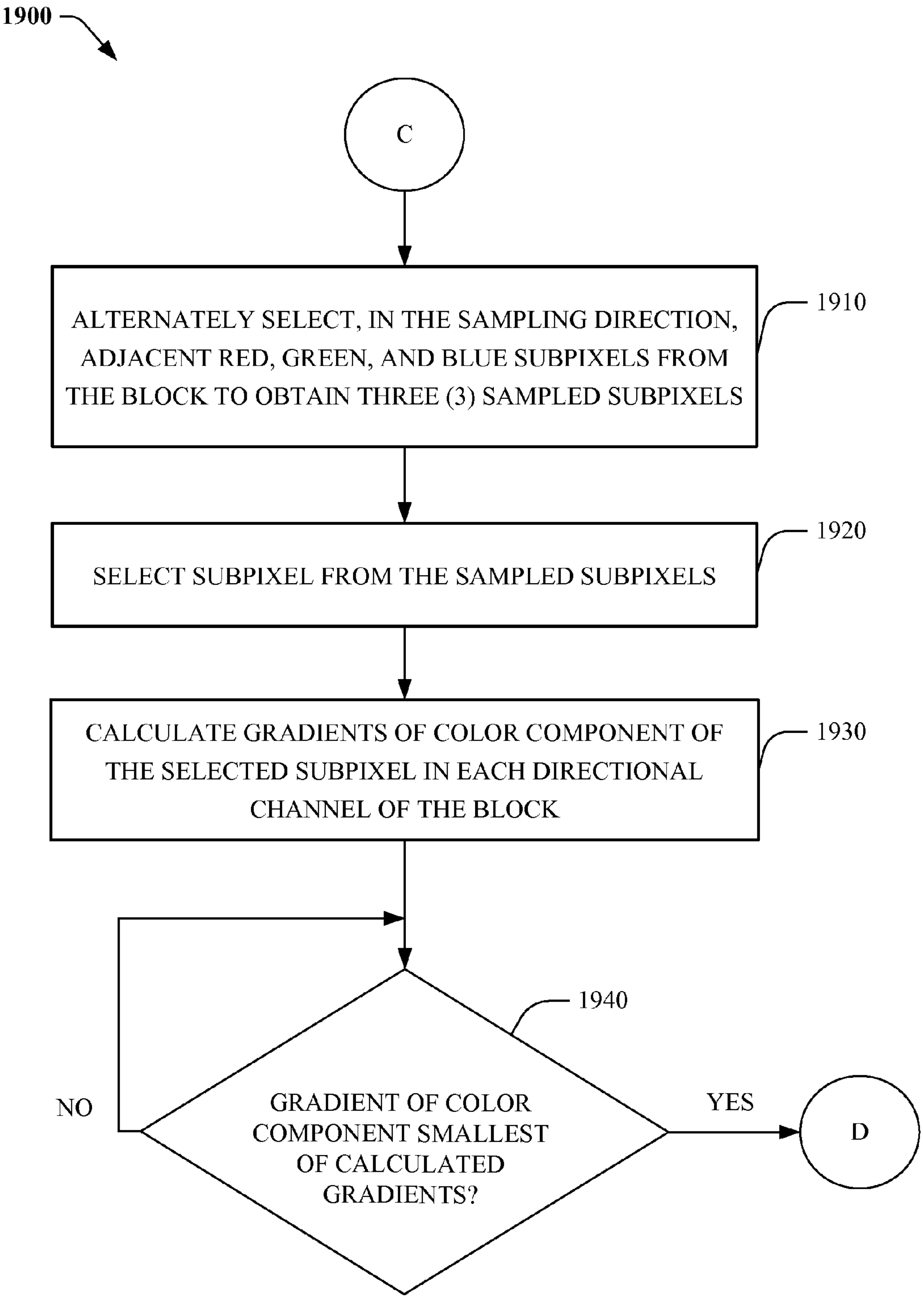
Figure 20:
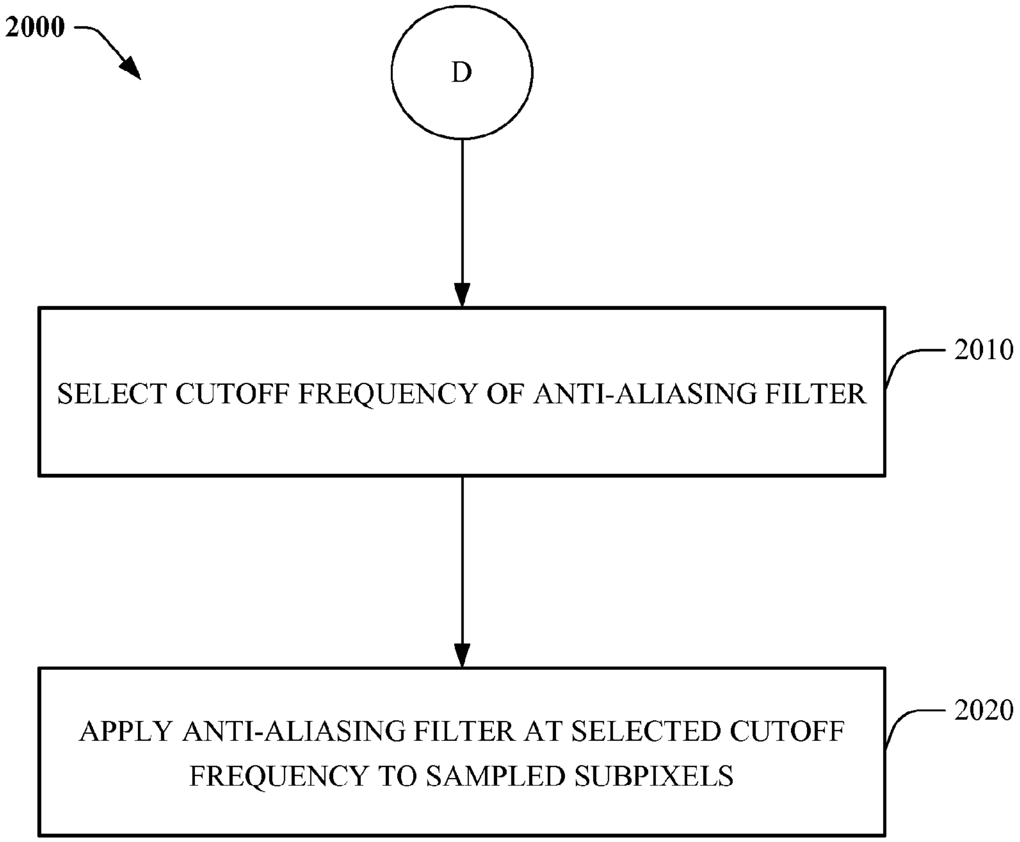

FIGS. 15-16 illustrate processes 1500 and 1600 associated with adaptive subpixel-based downsampling and filtering, in accordance with an embodiment. At 1510, image and/or video information, e.g., two-dimensional high resolution image 200, can be received. At 1520, the image and/or video information can be translated into OCD and/or ACD information. At 1530, blocks of pixels, e.g., 410, can be derived, separated, translated, etc. from the OCD and/or ACD information.

At 1540, gradients of a luminance component of a block of the blocks of pixels can be calculated in four directions, e.g., 420-450. At 1610, an edge direction of the block can be determined based on the calculated gradients, e.g., by selecting a direction associated with a minimum gradient of the gradients. At 1620, subpixels of the block can be selected based on a direction opposite the edge direction.

Gradients of a color component of a pixel of the subpixels can be calculated in the four directions at 1630. At 1640, an edge direction of the pixel can be determined based on the calculated gradients of the color component. In an aspect, the edge direction of the pixel can correspond to a direction associated with a minimum gradient of the calculated gradients of the color component. At 1650, the subpixels can be filtered, e.g., via a low pass filter with infinite impulse response, according to a direction opposite the edge direction.

Now referring to FIGS. 17-20, processes 1700-2000 associated with adaptive subpixel-based downsampling and filtering are illustrated, in accordance with an embodiment. At 1710, a two-dimensional (2-D) matrix of pixels of, e.g., a high resolution, image can be received. At 1720, it can be determined whether the image includes OCD information. If it is determined that the image includes OCD information, process 1700 can separate the image into blocks of three pixels-by-three pixels at 1740; otherwise, process 1700 can process the image to obtain YUV color domain information each pixel of the 2-D matrix. Flow continues from 1740 to 1810, at which four directional channels of edge, e.g., 420-450, of a block of the blocks can be defined. At 1820, gradients of a luminance component in each directional channel of the block can be calculated.

At 1830, it can be determined whether a gradient of the luminance component is a minimum gradient of the calculated gradients. If it is determined that the gradient is the minimum gradient, then process 1800 continues to 1840, at which a sampling direction can be selected that is different from a direction associated with the minimum gradient; otherwise flow returns to 1830, e.g., until a minimum gradient is found.

Flow continues from 1840 to 1910, at which process 1900 can alternately select, in the sampling direction, adjacent red, green, and blue subpixels from the block to obtain three sampled subpixels, e.g., 520. At 1920, process 1900 can select a subpixel from the three sampled subpixels, and at 1930, calculate gradients of a color component of the selected subpixel in each directional channel of the block. At 1940, it can be determined whether the gradient of the color component of the selected subpixel is a smallest gradient of the gradients calculated at 1930. If it is determined the gradient of the color component is the smallest gradient, flow continues to 2010, at which process 2000 can select a cutoff frequency of an anti-aliasing filter to apply to the three sampled subpixels; otherwise flow continues to 1940. Process 2000 continues from 2010 to 2020, at which the anti-aliasing filter can be applied to the three sampled subpixels.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 2122 (see below), disk storage 2124 (see below), and memory storage 2146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 21:
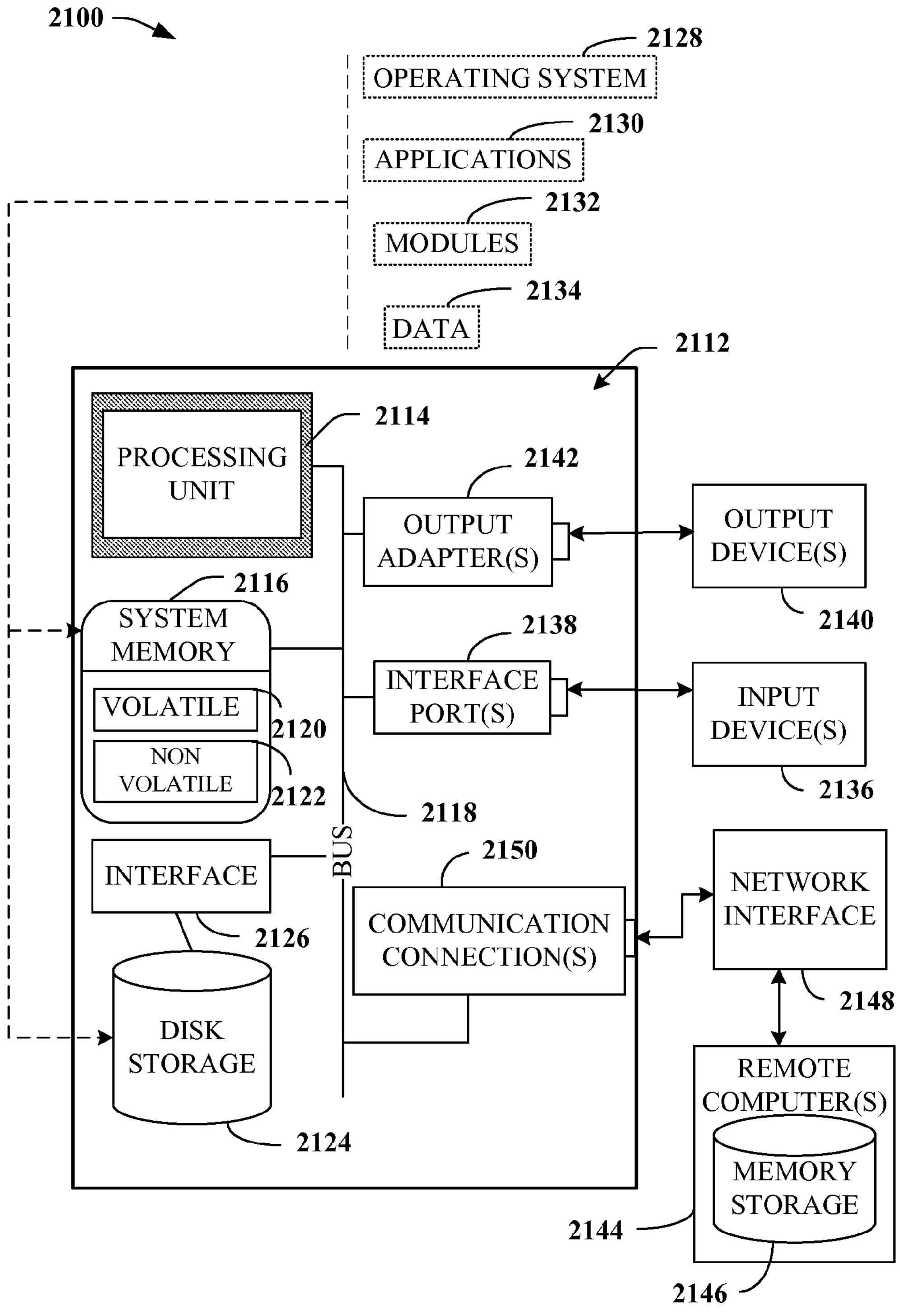
FIG. 21 illustrates a block diagram of a computing system operable to execute the disclosed systems and methods, in accordance with an embodiment.

In order to provide a context for the various aspects of the disclosed subject matter, FIG. 21, and the following discussion, are intended to provide a brief, general description of a suitable environment in which the various aspects of the disclosed subject matter can be implemented, e.g., various processes associated with FIGS. 1-20. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 21, a block diagram of a computing system 2100 operable to execute the disclosed systems and methods is illustrated, in accordance with an embodiment. Computer 2112 includes a processing unit 2114, a system memory 2116, and a system bus 2118. System bus 2118 couples system components including, but not limited to, system memory 2116 to processing unit 2114. Processing unit 2114 can be any of various available processors. Dual microprocessors and other multiprocessor architectures also can be employed as processing unit 2114.

System bus 2118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 2116 includes volatile memory 2120 and nonvolatile memory 2122. A basic input/output system (BIOS), containing routines to transfer information between elements within computer 2112, such as during start-up, can be stored in nonvolatile memory 2122. By way of illustration, and not limitation, nonvolatile memory 2122 can include ROM, PROM, EPROM, EEPROM, or flash memory. Volatile memory 2120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2112 can also include removable/non-removable, volatile/non-volatile computer storage media, networked attached storage (NAS), e.g., SAN storage, etc. FIG. 21 illustrates, for example, disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to system bus 2118, a removable or non-removable interface is typically used, such as interface 2126.

It is to be appreciated that FIG. 21 describes software that acts as an intermediary between users and computer resources described in suitable operating environment 2100. Such software includes an operating system 2128. Operating system 2128, which can be stored on disk storage 2124, acts to control and allocate resources of computer 2112. System applications 2130 take advantage of the management of resources by operating system 2128 through program modules 2132 and program data 2134 stored either in system memory 2116 or on disk storage 2124. It is to be appreciated that the disclosed subject matter can be implemented with various operating systems or combinations of operating systems.

A user can enter commands or information into computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2114 through system bus 2118 via interface port(s) 2138. Interface port(s) 2138 include, for example, a serial port, a parallel port, a game port, and a universal serial bus (USB). Output device(s) 2140 use some of the same type of ports as input device(s) 2136.

Thus, for example, a USB port can be used to provide input to computer 2112 and to output information from computer 2112 to an output device 2140. Output adapter 2142 is provided to illustrate that there are some output devices 2140 like monitors, speakers, and printers, among other output devices 2140, which use special adapters. Output adapters 2142 include, by way of illustration and not limitation, video and sound cards that provide means of connection between output device 2140 and system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. Remote computer(s) 2144 can be a personal computer, a server, a router, a network PC, a workstation, a microprocessor based appliance, a peer device, or other common network node and the like, and typically includes many or all of the elements described relative to computer 2112.

For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refer(s) to hardware/software employed to connect network interface 2148 to bus 2118. While communication connection 2150 is shown for illustrative clarity inside computer 2112, it can also be external to computer 2112. The hardware/software for connection to network interface 2148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a system comprising a processor, a luminance gradient of a block of pixels in four directions;

determining an edge direction of the block based on the luminance gradient of the block; and in response to the determining the edge direction of the block, selecting alternate subpixels of the block of pixels based on the edge direction of the block.

2. The method of claim 1, further comprising:

computing a color gradient, in the four directions, of a subpixel of the alternate subpixels;

in response to the computing the color gradient, determining an edge direction of the subpixel; and filtering the alternate subpixels in response to the determining the edge direction of the subpixel.

3. The method of claim 2, wherein the filtering the alternate subpixels comprises:

selecting a low pass filter associated with an infinite impulse response; and filtering the alternate subpixels utilizing the low pass filter.

4. The method of claim 1, wherein the determining the luminance gradient comprises determining the luminance gradient in at least one of a horizontal direction, a vertical direction, a left diagonal direction, or a right diagonal direction.

5. The method of claim 1, wherein the determining the luminance gradient in the four directions comprises:

determining the luminance gradient in a horizontal direction, a vertical direction, a left diagonal direction, and a right diagonal direction; and selecting a minimum luminance gradient with respect to the horizontal direction, the vertical direction, the left diagonal direction, and the right diagonal direction.

6. The method of claim 1, wherein the selecting the alternate subpixels comprises selecting the alternate subpixels in a direction opposite the edge direction of the block.

7. The method of claim 2, wherein the computing the color gradient comprises computing the color gradient in at least one of a horizontal direction, a vertical direction, a left diagonal direction, or a right diagonal direction.

8. The method of claim 2, wherein the computing the color gradient comprises:

computing the color gradient in a horizontal direction, a vertical direction, a left diagonal direction, and a right diagonal direction; and selecting a minimum value of the color gradient with respect to the horizontal direction, the vertical direction, the left diagonal direction, and the right diagonal direction.

9. The method of claim 2, wherein the computing the color gradient comprises filtering the alternate subpixels in a direction opposite the edge direction of the subpixel.

10. The method of claim 5, wherein the determining the edge direction of the block comprises selecting the edge direction of the block based on the minimum luminance gradient.

11. The method of claim 8, wherein the determining the edge direction of the subpixel comprises selecting the edge direction of the subpixel based on the minimum value of the color gradient.

12. A system, comprising:

a memory to store instructions; and a processor, coupled to the memory, that executes or facilitates execution of the instructions to at least:

determine at least one gradient of a luminance of a block of pixels based on at least one direction;

determine a selected direction of the block based on the at least one gradient of the luminance; and select alternate subpixels of the block based on the selected direction of the block.

13. The system of claim 12, wherein the processor further executes or facilitates the execution of the instructions to:

determine the at least one gradient of the luminance in a horizontal direction, a vertical direction, a left diagonal direction, and a right diagonal direction; and select the direction of the block associated with a direction related to the minimum gradient of the at least one gradient of the luminance.

14. The system of claim 12, wherein the processor further executes or facilitates the execution of the instructions to select the alternate subpixels in a direction opposite the selected direction of the block.

15. The system of claim 12, wherein the processor further executes or facilitates the execution of the instructions to:

determine at least one color gradient of a subpixel of the alternate subpixels based on the at least one direction;

determine a direction of the subpixel based on the at least one color gradient; and filter the alternate subpixels based on the direction of the subpixel.

16. The system of claim 15, wherein the processor further executes or facilitates the execution of the instructions to:

select a low pass filter associated with an infinite sinc function; and filter the alternate subpixels utilizing the low pass filter.

17. The system of claim 15, wherein the processor further executes or facilitates the execution of the instructions to:

determine the at least one color gradient of the subpixel in a horizontal direction, a vertical direction, a left diagonal direction, and a right diagonal direction;

determine a minimum gradient of the at least one color gradient; and select the direction of the subpixel based on the minimum gradient of the at least one color gradient.

18. The system of claim 17, wherein the processor further executes or facilitates the execution of the instructions to filter the alternate subpixels in another direction opposite the direction of the subpixel.

19. A method, comprising:

determining, by a system comprising a processor, a gradient of a luminance value of a block of pixels in at least one direction;

determining an edge direction of the block in response to the determining the gradient of the luminance value; and selecting alternate subpixels of the block in response to the determining the edge direction of the block.

20. The method of claim 19, further comprising:

selecting the block from image information.

21. The method of claim 19, further comprising:

obtaining luminance information of the block from color domain information of the block.

22. The method of claim 19, wherein the determining the gradient comprises determining the gradient in a horizontal direction, a vertical direction, a left diagonal direction, and a right diagonal direction to obtain determined gradients.

23. The method of claim 22, wherein the determining the edge direction of the block comprises:

determining a minimum gradient of the determined gradients; and selecting the edge direction of the block based on the minimum gradient.

24. The method of claim 19, further comprising:

determining a gradient of a color value of a subpixel of the alternate subpixels in the at least one direction;

determining an edge direction of the subpixel in response to the determining the gradient of the color value; and applying a filter to the alternate subpixels in response to the determining the edge direction of the subpixel.

25. The method of claim 24, wherein the applying the filter comprises:

selecting a low pass filter of an infinite impulse response; and applying the low pass filter to the alternate subpixels.

26. An apparatus, comprising:

means for selecting a block of pixels from image information;

means for determining a gradient of a luminance of the block in four directions; and means for sampling alternate subpixels of the block based on an output of the means for the determining the gradient of the luminance of the block.

27. The apparatus of claim 26, further comprising:

means for determining a color gradient of a subpixel of the alternate subpixels in the four edge directions; and means for filtering the alternate subpixels based on an output of the means for the determining the color gradient.

* * * * *